United States Patent
Ohi et al.

(10) Patent No.: US 8,658,980 B2
(45) Date of Patent: Feb. 25, 2014

(54) RADIATION DETECTOR

(75) Inventors: Junichi Ohi, Muko (JP); Masanobu Sato, Kizugawa (JP); Masafumi Furuta, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/820,972

(22) PCT Filed: Apr. 22, 2011

(86) PCT No.: PCT/JP2011/002376
§ 371 (c)(1),
(2), (4) Date: Mar. 5, 2013

(87) PCT Pub. No.: WO2012/032689
PCT Pub. Date: Mar. 15, 2012

(65) Prior Publication Data
US 2013/0175451 A1 Jul. 11, 2013

(30) Foreign Application Priority Data
Sep. 6, 2010 (JP) ................. 2010-199185

(51) Int. Cl.
*G01T 1/164* (2006.01)
*G01T 1/166* (2006.01)
*H05B 33/00* (2006.01)

(52) U.S. Cl.
USPC ............. 250/363.03; 250/363.05; 250/484.4

(58) Field of Classification Search
USPC .................... 250/363.03, 363, 484.45
See application file for complete search history.

(56) References Cited

U.S. PATENT DOCUMENTS

2011/0220803 A1* 9/2011 Ohi et al. ............. 250/369

FOREIGN PATENT DOCUMENTS

| JP | 2009-222439 A | 10/2009 |
| JP | 2009-229127 A | 10/2009 |

OTHER PUBLICATIONS

International Search Report issued in International Application No. PCT/JP2011/002376 mailed Aug. 2, 2011.

* cited by examiner

*Primary Examiner* — David Porta
*Assistant Examiner* — Kenneth J Malkowski
(74) *Attorney, Agent, or Firm* — McDermott Will & Emery LLP

(57) ABSTRACT

A radiation detector is provided that allows correction so as to identify incident gamma-ray positions accurately with no influence of afterglow of fluorescence. The radiation detector includes an intensity-data acquiring section for acquiring intensity data representing intensity of fluorescence outputted from a light detector for every temporally-constant sampling interval, and a correction-value acquiring section section for acquiring a correction value used for correction of variations in intensity data resulting from afterglow of the fluorescence. In addition, the radiation detector includes an integrating section for correcting the intensity data using the correction value. This allows correct calculation of the integrated value m with no influence of the afterglow of fluorescence.

14 Claims, 7 Drawing Sheets

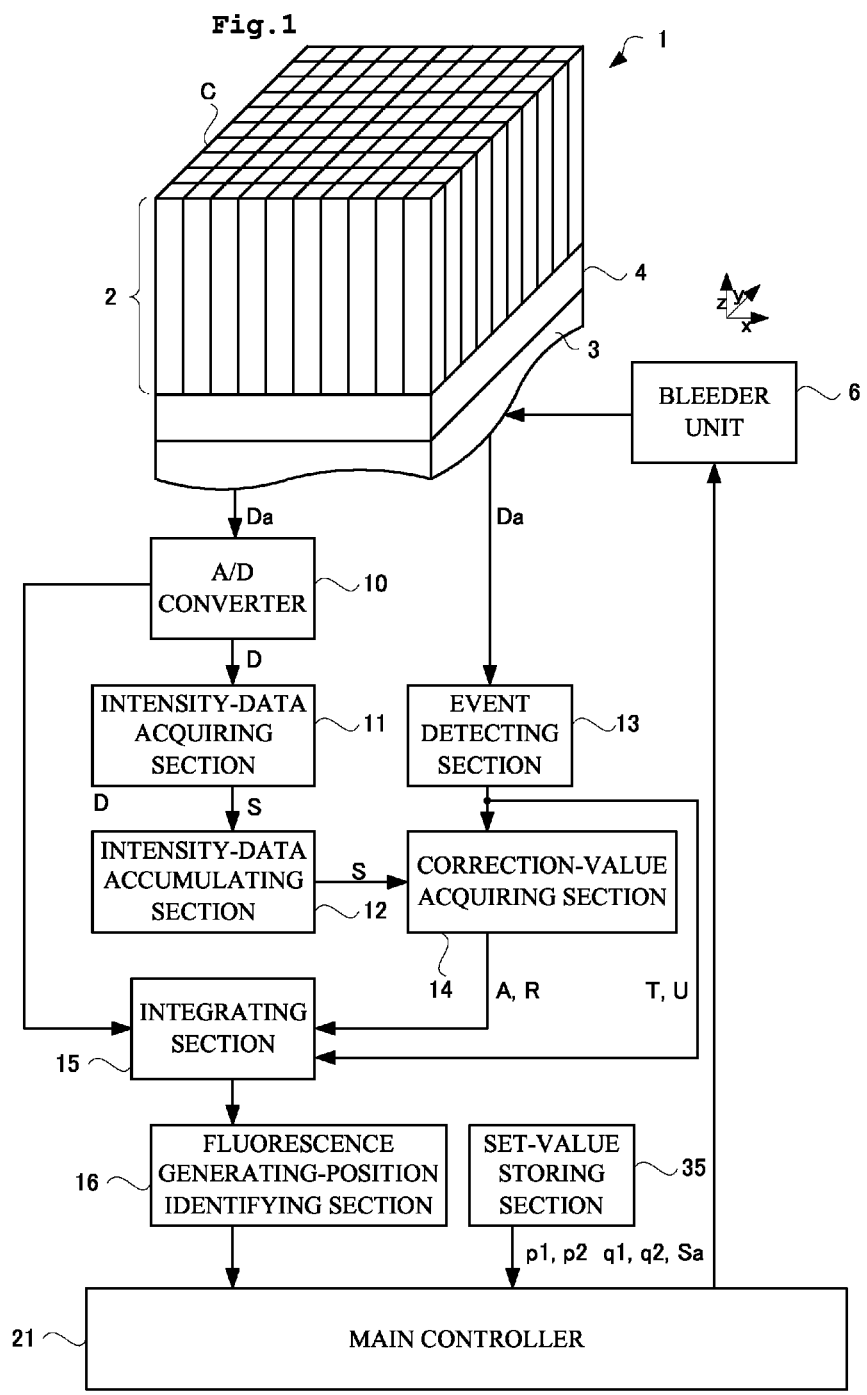

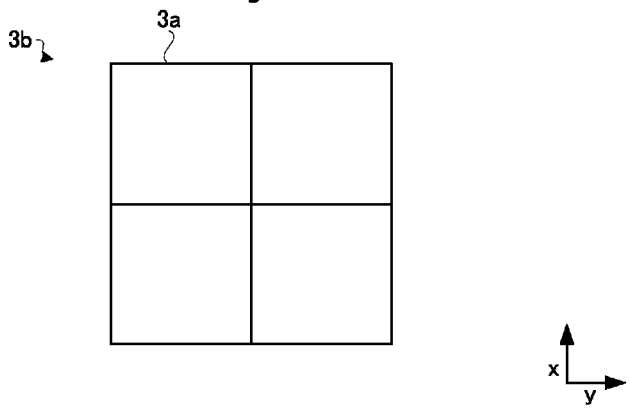
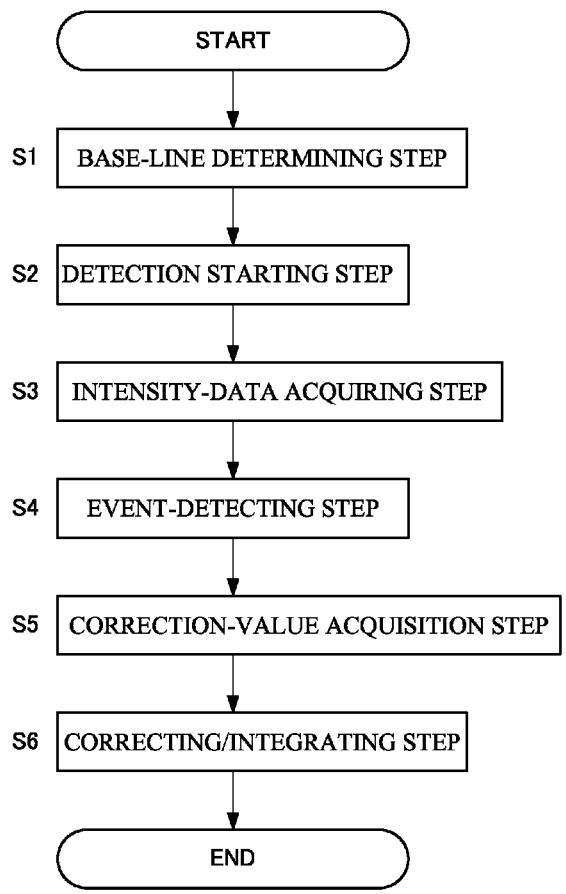

Fig. 9
Prior art
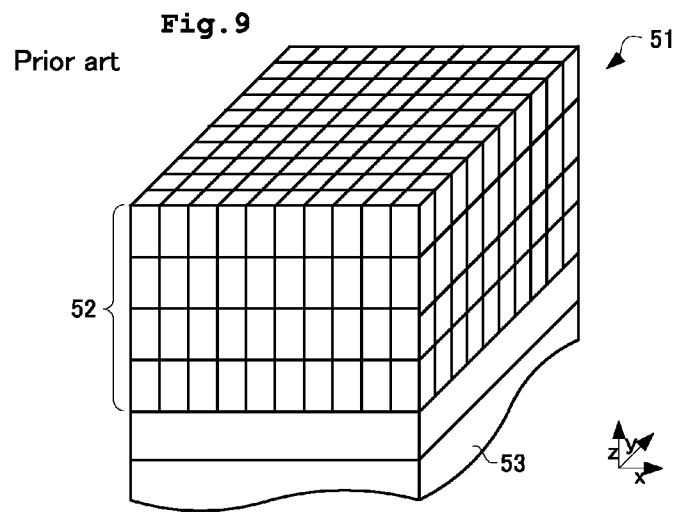
Fig. 10
Prior art
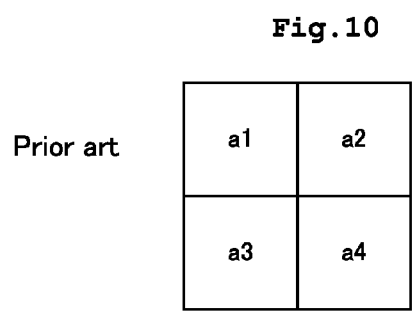
Fig. 11
Prior art
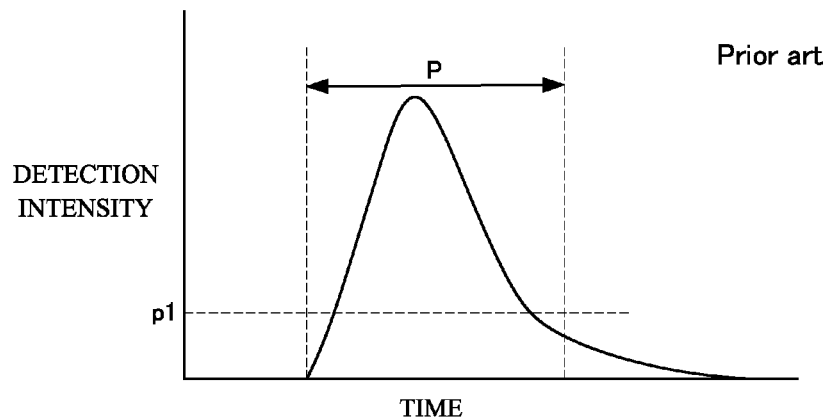

RADIATION DETECTOR

RELATED APPLICATIONS

This application is the U.S. National Phase under 35 U.S.C. §371 of International Application No. PCT/JP2011/002376, filed on Apr. 22, 2011, which in turn claims the benefit of Japanese Application No. 2010-199185, filed on Sep. 6, 2010, the disclosures of which Applications are incorporated by reference herein.

BACKGROUND

1. Field of the Invention

This invention relates to a radiation detector for correcting detection signals of annihilation radiation-pairs. More particularly, this invention is directed to a radiation detector having a construction of converting radiation into fluorescence and determining the fluorescence, the radiation detector allowing to remove influences of afterglow of fluorescence by correction.

2. Description of the Related Art

Description will be given of a specific construction of a conventional positron emission tomography (PET) device for imaging distribution on radiopharmaceutical. The conventional PET device includes a radiation ring having radiation detectors arranged circularly for detecting radiation. The detector ring detects a pair of gamma-rays (an annihilation radiation-pair) having opposite directions to each other that is emitted from inside of a subject.

Next, description will be given of a construction of a radiation detector 51. As shown in FIG. 9, the radiation detector 51 includes a scintillator 52 having scintillation crystals arranged three-dimensionally, and a light detector 53 for detecting fluorescence from gamma-rays absorbed into the scintillator 52. The light detector 53 has a detection surface where multiple optical detecting elements are arranged in a matrix. The detection surface of the light detector 53 is optically connected with one surface of the scintillator 52. See Japanese Patent Publications No. 2009-222439 and No. 2009-229127.

Radiation entering into the scintillator 52 is converted into many photons to travel toward the light detector 53. Here, the photons, entering into the scintillator 52 while spatially spreading, enter into each detection surface of the light detector 53 arranged in a matrix. That is, many photons from fluorescence are simultaneously split into optical detecting elements for detection.

The radiation detector 51 determines a position in the scintillator 2 where fluorescence is emitted with use of detection data on fluorescence that is captured by two or more optical detecting elements. That is, the radiation detector 51 determines a position of a center of gravity in a luminous flux of fluorescence on the detection surface by two or more optical detecting elements. The position of the center of gravity means a position where fluorescence has been generated. Information on the position is used for identifying positions where radiopharmaceutical within the subject is accumulated.

However, the conventional detection of radiation noted above has a following drawback. Specifically, more doses of radiation entering into the radiation detector 51 may lead to incorrect identification of the position where fluorescence is generated.

This drawback concerns to a calculation process of the center of gravity in the luminous flux of fluorescence. Here, the calculation process is to be described. For simplification, it is assumed that the detection surface of the light detector 53 has 2 by 2 optical detecting elements, as illustrated in FIG. 10. The detection signals (correctly, an integrated value m where intensity data representing an intensity of fluorescence is integrated with a time since fluorescence is detected with temporal variations) of fluorescence outputted from the optical detecting elements a1 to a4 are denoted by A1 to A4, respectively. Here, the symbols A1 to A4 each indicate intensity of fluorescence detected by the optical detecting elements a1 to a4, respectively. A position X of the center of gravity in the luminous flux of fluorescence in an x-direction is expressed as follows under assumption of a center position as a starting point:

$$X = \{(A1+A3)-(A2+A4)\}/\{(A1+A2+A3+A4)\} \quad (1)$$

Specifically, more doses of radiation entering into the radiation detector 51 may lead to a phenomenon of apparently increased detection intensity of fluorescence. Next, description will be given of this phenomenon. FIG. 11 illustrates temporal variations in fluorescence that the optical detecting elements detect. Fluorescence emitted in the scintillator continues to be applied to the optical detecting elements for a while, although it is weak. Upon detecting of radiation, it takes much time to detect fluorescence in consideration of disappearance of such afterglow of fluorescence. Consequently, the radiation detector 51 determines fluorescence taking no account of the afterglow. Specifically, as illustrated in FIG. 11, the radiation detector 51 integrates detection intensity outputted by the optical detecting elements a1 to a4 during a period P with a time for calculating fluorescence detection intensity A1 to A4. Here, the afterglow is not considered as the fluorescence detection intensity. An event threshold value denoted by p1 in FIG. 11 is used for identifying fluorescence occurrence.

If more doses of radiation enter into the radiation detector 51, subsequent fluorescence is emitted before afterglow of previous fluorescence disappears. That is, fluorescence having a temporal width will temporally overlap each other. Specifically, as illustrated in FIG. 12, an afterglow component denoted by S is to be added in calculation of fluorescence detection intensity.

Such phenomenon occurs in every detection intensity of A1 to A4. Here, letting afterglow factor for A1 to A4 are denoted by $\alpha$, $\beta$, $\gamma$, $\delta$, respectively, a position X as the center of gravity calculated under existence of the afterglow factor is given as follows:

$$X = \{(A1+\alpha+A3+\gamma)-(A2+\beta+A4+\delta)\}/\{(A1+\alpha+A2+\beta+A3+\gamma+A4+\delta)\} \quad (2)$$

The afterglow factor $\alpha$, $\beta$, $\gamma$, $\delta$ each has an approximately equal value. Consequently, the afterglow factor in numerator of Equation 2 are offset. On the other hand, the afterglow factor in denominator of Equation 2 are not eliminated, but rather added to increase. Accordingly, the position X has a value in Equation 2 different from an actual value under influence of the afterglow factor. Specifically, existence of the afterglow factor may lead to increased denominator of Equation 2, thereby decreasing an absolute value of the position X. This phenomenon occurs in a y-direction orthogonal to the x-direction.

Description will be given of influences that the afterglow factor exert on mapping positions of the center of gravity. Suppose that fluorescence is emitted from each center of scintillation crystals that form the scintillator 2. Here, a point p in FIG. 13 is a fluorescence generating position. The radiation detector 51 identifies the fluorescence generating position, as illustrated in FIG. 13, under no influence of the afterglow factor.

Where fluorescence to be detected includes the afterglow component, the radiation detector 51 cannot correctly identify the fluorescence generating position illustrated in FIG. 13. That is, absolute values of X and Y in Equation 2 will be decreased apparently under the influence of the afterglow. Accordingly, as illustrated in FIG. 14, the fluorescence generating positions to be calculated deviate apparently toward the center of the scintillator 2, resulting in decreased distribution of the fluorescence generations. As above, with the conventional art, the afterglow of fluorescence causes incorrect identification of the fluorescence generating positions. Here, the position Y corresponds to a position of the fluorescence generating position in the y-direction.

This invention has been made regarding the state of the art noted above, and its object is to provide a radiation detector that allows correction so as to identify incident gamma-ray positions accurately with no influence of afterglow of fluorescence.

SUMMARY

This invention is constituted as stated below to achieve the above object. An example of the invention with a first construction is a radiation detector including (A) a scintillator having scintillation crystals for converting radiation into fluorescence being arranged; (B) a light detector for detecting fluorescence; (C) an intensity-data acquiring device for acquiring intensity data representing intensity of the fluorescence outputted from the light detector for every temporally-constant sampling interval; (D) an intensity-data accumulating device for accumulating the intensity data acquired by the intensity-data acquiring device; (E1) a storing device for storing a plurality of event threshold values; (F) an event detecting device for comparing the intensity data to be acquired successively and an event threshold value for intensity data comparison and recognizing that, when the intensity data exceeds the event threshold value, the event that radiation enters into the scintillator occurs, thereby obtaining an event-occurrence time when the event occurs; (G1) a correction-value acquiring device for acquiring a correction value in accordance with intensity-data and double-event threshold value and multiple-event threshold value, the intensity data being detected prior to the event-occurrence time and the correction value being used for correcting variations in intensity data resulting from afterglow of the fluorescence; and (H) an integration device for calculating an integrated value by integrating the intensity data detected prior and subsequent to the event-occurrence time and performing correction using the correction value.

Another example of the invention with a second construction is a radiation detector including (A) a scintillator having scintillation crystals for converting radiation into fluorescence being arranged; (B) a light detector for detecting fluorescence; (C) an intensity-data acquiring device for acquiring intensity data representing intensity of the fluorescence outputted from the light detector for every temporally-constant sampling interval; (E2) a storing device for storing a fluorescence of threshold value; (F) an event detecting device for comparing the intensity data to be acquired successively and an event threshold value for intensity data comparison and recognizing that, when the intensity data exceeds the event threshold value, the event that radiation enters into the scintillator occurs, thereby obtaining an event-occurrence time when the event occurs; (G2) a correction-value acquiring device for comparing the intensity data acquired by the intensity-data acquiring device with a fluorescence threshold value for fluorescence identification, and recognizing that the intensity data less than the fluorescence threshold value is acquired when no event occurs, thereby acquiring a correction value for correcting variations in intensity data in accordance with the intensity-data acquired in this state, the variations in intensity data resulting from afterglow of the fluorescence; and (H) an integration device for calculating an integrated value by integrating the intensity data detected immediately prior and subsequent to the event-occurrence time and performing correction using the correction value.

[Operation and Effect]

The examples of the invention include the integration device for integrating the intensity data representing intensity of the fluorescence outputted from the light detector for every temporally-constant sampling interval and calculating the integrated value representing intensity of fluorescence generated by incident radiation into the scintillator. Output of the integrating device is used for identifying the generation positions of fluorescence within the scintillator. Since complete annihilation of the fluorescence generated in the scintillator requires a longer time, the intensity data outputted from the light detector contains afterglow factor of the fluorescence generated before under a high intensity of radiation and a high counting rate. Consequently, the integrating device calculates the integrated value including the afterglow factor unnecessarily and additionally, resulting in some affect in identifying the position of fluorescence.

Accordingly, the examples of the invention include the intensity-data acquiring device for acquiring intensity data representing intensity of the fluorescence outputted from the light detector for every temporally-constant sampling interval, and the correction-value acquiring device for acquiring the correction value used for correcting variations in intensity data resulting from afterglow of the fluorescence. In addition, the examples of the invention include the integrating device for correcting the intensity data using the correction value. This allows correct calculation of the integrated value with no influence of the afterglow of fluorescence. Consequently, the examples of the invention enable to provide a radiation detector that allows correct identification of the generation positions of fluorescence.

The correction-value acquiring device in the second construction of the invention uses the fluorescence threshold value for fluorescence identification. This is because the correction value has to be obtained with use of the intensity data acquired where no event occurs.

Next, desirable application of the first and second construction will be exemplified hereinafter. As long as there is no notice, each of the following aspects is applicable to every construction above.

In the radiation detector having the first construction above, it is more preferable that the correction-value acquiring device acquires a correspondence value, corresponding to the correction value, in accordance with a table having a relationship between the correction value stored in the storing device and the correspondence value when the acquired correction value is the double-event threshold value or more, and the integrating device corrects the intensity data in accordance with the correspondence value.

[Operation and Effect]

The above describes in detail the first construction of the invention. That is, where the correction value is the double-event threshold value or more, the integrating device corrects the intensity data in accordance with the correspondence value. Where the obtained correction value is high, it is recognized that current radiation enters into the scintillator as soon as the previous radiation enters into the scintillator. Accordingly, when the integrated value of current radiation is determined, the integrated value also containing the afterglow factor of the previous radiation is to be calculated. Thus it is difficult to obtain the correction value simply from the intensity data acquired prior to the event-occurrence time when fluorescence concerting current radiation starts emitting. This is because the afterglow factor of radiation concerning the previous radiation attenuate during determination of the intensity data concerning current radiation. As a result, the foregoing construction adopts the correspondence value that corresponds to the correction value for correcting the integrated value. The correspondence value is variable so as to perform suitable correction in accordance with the correction value. Consequently, the foregoing construction of the invention enables to provide the radiation detector that allows correct calculation of the integrated value with no influence of the afterglow factor of fluorescence.

Moreover, in the radiation detector having the above-mentioned first construction, it is more preferable that the correction-value acquiring device performs no operation when the acquired correction value is the multiple-event threshold value or more, and the integrating device calculates the integrated value with no correction, the multiple-event threshold value representing a higher value than the double-event threshold value.

[Operation and Effect]

The above describes in detail the first construction of the invention. That is, when the acquired correction value is the multiple-event threshold value-er-more representing a higher value than the double-event threshold value, the correction-value acquiring device performs no operation. That is because when the intensity data obtained prior to the event-occurrence time has a value higher than the multiple-event threshold value, the intensity data contains many overlapped afterglow factor, and in this case it is difficult to calculate the correction value. In the construction above, when the intensity data obtained prior to the event-occurrence time has a higher value and thus no correction value with high-reliability is acquired, the integrating device calculates the integrated value with no correction. This needs no correction, resulting in the radiation detector that allows correct determination of the integrated value with no influence of the afterglow factor of fluorescence.

Moreover, in the radiation detector having the above-mentioned second construction, it is more preferable that (I) the correction-value acquiring device acquires the correction value by averaging two or more points of intensity data read out from the intensity-data accumulating device, and that (J) the correction-value acquiring device continuously compares the intensity data with the fluorescence threshold value until a given number of points of the intensity data are obtained.

[Operation and Effect]

The above describes in detail the second construction of the invention. The correction-value acquiring device continuously compares the intensity data with the threshold value for identification until a given number of points of the intensity data are obtained, thereby acquiring an average of the intensity data with high-reliability. Such a configuration is advantageous when all of the intensity data cannot be used for calculating the average.

Moreover, in the radiation detector having the above-mentioned second construction, it is more preferable that (K) the correction-value acquiring device successively acquires the correction value by continuously comparing the intensity data with the threshold value for identification also after completion of acquiring the correction data, and updates the correction value for every correction-data acquisition.

[Operation and Effect]

The above describes in detail the second construction of the invention. The correction-value acquiring device successively acquires the correction value by continuously comparing the intensity data with the threshold value for identification also after completion of acquiring the correction data, and updates the correction value for every correction-data acquisition. This allows provision of the radiation detector that enables to correct the integrated value accurately following temporal variations in characteristic of the radiation detector for detecting radiation.

Moreover, in the radiation detector having the above-mentioned second construction, it is more preferable that the light detector detects fluorescence for a time interval, and that the intensity-data acquiring device has the sampling interval longer than the time interval of the light detector for detecting fluorescence.

[Operation and Effect]

The above describes in detail the second construction of the invention. When the intensity-data acquiring device has sampling time intervals longer than the time interval of the light detector for detecting fluorescence, the correction-value acquiring device does not need to perform many calculations for acquiring the correction value. As a result, the radiation detector can be provided having decreased load for operation.

Moreover, in the radiation detector having the above-mentioned second construction, it is more preferable that the intensity-data acquiring device has the sampling interval of 10 microseconds or more for acquiring the intensity data.

[Operation and Effect]

The above describes in detail the second construction of the invention. The sampling interval of 10 microseconds or more of the intensity-data acquiring device causes sufficient determination of the correction value with high-reliability.

Moreover, the above-mentioned radiation detector preferably includes a bleeder unit for supplying power to the light detector, and the correction value to be acquired by the correction-value acquiring device is preferably calculated by subtracting a base level as the intensity data from the intensity data, the base level being acquired with no power being applied to the light detector.

[Operation and Effect]

The above describes in detail the first and the second construction of the invention. The intensity data as a basis of the correction value contains, besides the factor with respect to fluorescence, various factor from each device for performing information processing to provide the construction of this invention. Here, the correction value is calculated by subtracting the basal value acquired with no power being applied to the light detector from the intensity data, resulting in provision of the radiation detector that allows accurate calculation of the integrated value.

Moreover, in the above-mentioned radiation detector, it is more preferable that (I) the correction-value acquiring device acquire the correction value by averaging two or more points of intensity data read out from the intensity-data accumulating device.

[Operation and Effect]

The above describes in detail the first and the second construction of the invention. Here, the correction value is acquired by averaging two or more points of intensity data, resulting in provision of the radiation detector that allows more accurate correction of the integrated value with no influence of noise factor in the intensity data.

Moreover, it is more preferable that the above-mentioned radiation detector includes a fluorescence generating-position identifying device for identifying generating positions of fluorescence in the scintillator with use of the integrated value generated by the integrating device.

[Operation and Effect]

The above describes in detail the first and the second construction of the invention. That is, the above-mentioned construction specifies the device for identifying the generating positions of fluorescence in the scintillator.

The examples of the invention include the intensity-data acquiring device for acquiring the intensity data representing intensity of the fluorescence outputted from the light detector for every temporally-constant sampling interval, and the correction-value acquiring device for acquiring the correction value used for correcting variations in the intensity data resulting from afterglow of the fluorescence. In addition, the examples of the invention include the integrating device for correcting the intensity data using the correction value. This allows correct calculation of the integrated value with no influence of the afterglow of fluorescence. Consequently, the embodiments of this invention enable to provide the radiation detector that allows correct identification of the generation positions of fluorescence.

BRIEF DESCRIPTION OF THE DRAWINGS

FIG. 1 is a functional block diagram illustrating a radiation detector according to one example of the invention.

FIG. 2 is a plan view illustrating operations of a light detector according to the example of the invention.

FIG. 3 is a flow chart illustrating operations of the radiation detector according to the example of the invention.

FIGS. 9 to 14 are schematic views each illustrating a conventional radiation detector.

DETAILED DESCRIPTION

Figure 4:
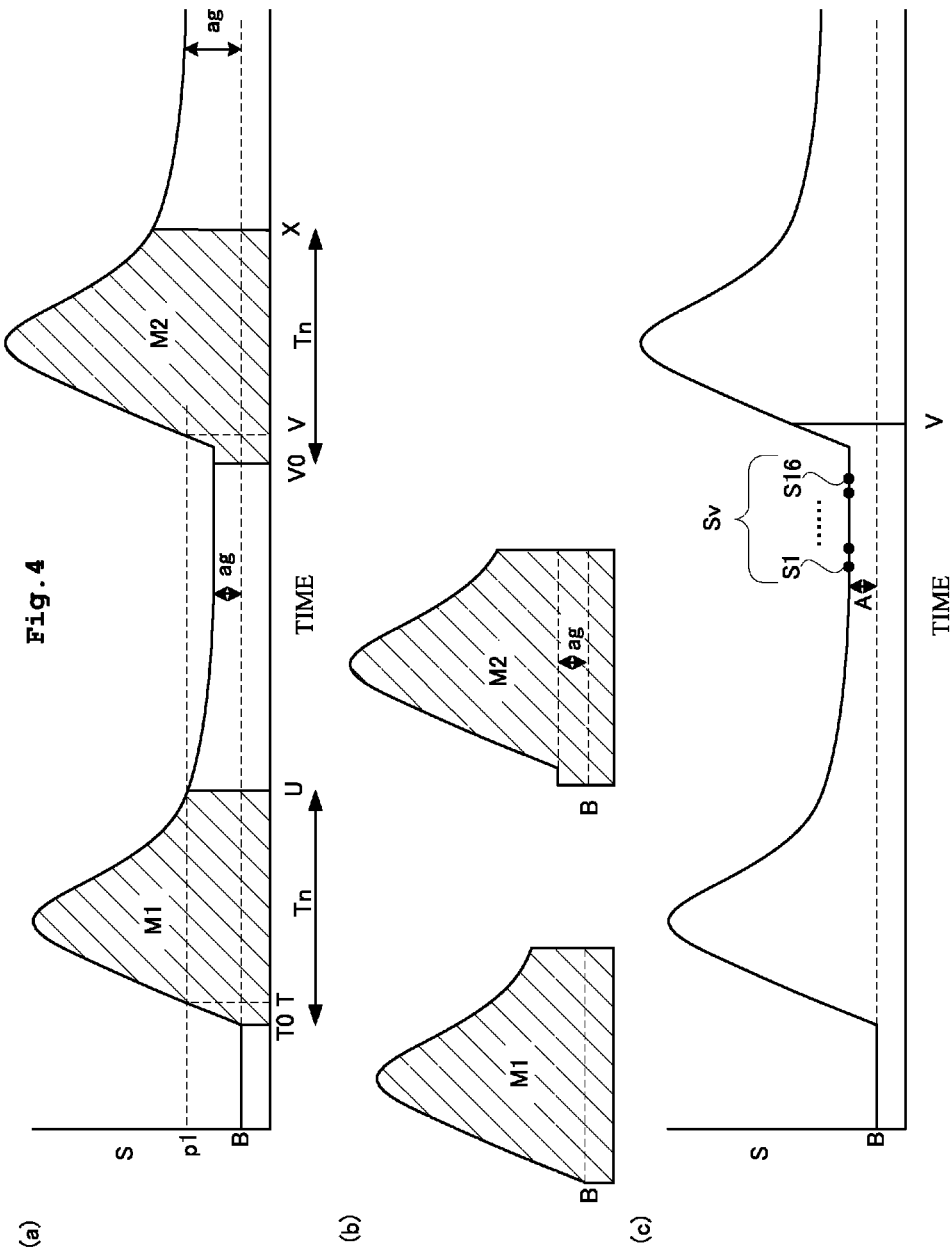
FIG. 4 is a schematic view illustrating operations of the radiation detector according to the example of the invention.

Now, description will be given of the best mode for carrying out this invention with examples of this invention.

Example 1

Next, description will be given of one example of a radiation signal-processing unit and a radiation detector according to this invention. Here, gamma-rays are an example of radiation.

<Overall Construction of Radiation Signal-Processing Unit and Radiation Detector>

As illustrated in FIG. 1, the radiation detector 1 according to Example 1 includes a scintillator 2 having scintillation crystals C arranged vertically and transversely, a light detector 3 provided on an undersurface of the scintillator 2 for detecting fluorescence emitted from the scintillator 2, and a light guide 4 interposed between the scintillator 2 and the light detector 3. Each of the scintillation crystals C is composed of Ce-doped $Lu_{2(1-X)}Y_{2X}SiO_5$ (hereinafter referred to as LYSO.)

The light detector 3 is formed by four photomultiplier tubes 3a, and allows position discrimination of incident fluorescence in the x and y directions. Specifically, as illustrated in FIG. 2, the light detector 3 has a detecting surface 3b having 2 in height and 2 in width photomultiplier tubes 3a arranged in a matrix. The detecting surface 3b is optically connected to the scintillator 2. When fluorescence is generated, each of the photomultiplier tubes 3a outputs intensity data representing fluorescence intensity. The light detector 3 adds information to the intensity data, the information representing a photomultiplier tube 3a performing detection and the amount of fluorescence detected by the photomultiplier tube 3a. The light detector 3 outputs the information to an A/D converter 10 (see FIG. 1.) Accordingly, detected data outputted from the light detector 3 includes both intensity information and positional information of fluorescence.

The light guide 4 is provided for guiding fluorescence generated in the scintillation 2 into the light detector 3. Consequently, the light guide 4 is optically coupled to the scintillator 2 and the light detector 3.

A bleeder unit 6 is provided as a power source of the light detector 3. The bleeder unit 6 supplies high voltages to the photomultiplier tubes 3a of the light detector 3. The photomultiplier tube 3a amplifies photons derived from fluorescence in accordance with the supplied high voltages, and outputs detection data Da. The detection data Da contains intensity data S representing intensity of fluorescence and time data representing a time when the intensity data S is detected.

The A/D converter 10 is provided for digitizing the detection data Da as analog data of the light detector 3. A fluorescence generating-position identifying section 16 is provided for identifying generating positions of fluorescence in the scintillator 2 in accordance with an integrated value outputted from an integrating section 15. The generating positions of fluorescence are determined by the same method as that described using Equation 1 above. The integrating section 15 corresponds to the integrating device in this invention. The fluorescence generating-position identifying section 16 corresponds to the fluorescence generating-position identifying device in this invention. An individual value of the detection data Da is outputted for every photomultiplier tube 3a of the light detector 3. Since the light detector 3 has four photomultiplier tubes 3a, the light detector 3 transmits four channels of detection data Da, independent to one another, to the A/D converter 10.

In addition, the radiation detector 1 further includes an intensity-data acquiring section 11; an intensity-data accumulating section 12; an event detecting section 13; a correction-value acquiring section 14; and an integrating section 15. The intensity-data acquiring section 11 receives every detection data (correctly, detection data D obtained by digitizing the detection data) outputted from the light detector 3 for every temporally-constant sampling interval Sa, and acquires intensity data S contained in the digitized detection data D in accordance with the received detection data. The intensity-data accumulating section 12 accumulates the intensity data S acquired by the intensity-data acquiring section 11. The event detecting section 13 compares the sum of the four pieces of detection data Da outputted from each of the photomultiplier tubes 3a with an event threshold value p1 for intensity-data comparison and recognizes that, when the sum of the four pieces of detection data Da exceeds the event threshold value p1, an event has occurred that gamma-rays enter into the scintillator 2, thereby obtaining an event-occurrence time T as a time when the event has occurred. The correction-value acquiring section 14 reads out the intensity data S detected prior to the event-occurrence time T from the intensity-data accumulating section 12, and acquires a correction value A used for correcting variations in intensity data S resulting from afterglow of fluorescence. The integrating section 15 integrates the intensity data S detected immediately prior to and subsequent to the event-occurrence time T and performs correction using the correction value A. The intensity-data acquiring section 11 corresponds to the intensity-data acquiring device in this invention. The intensity-data accumulating section 12 corresponds to the intensity-data accumulating device in this invention. The event detecting section 13 corresponds to the event detecting device in this invention. The correction-value acquiring section 14 corresponds to the correction-value acquiring device in this invention.

A set-value storing section 35 stores all of a threshold value, a table, and a map, and the like, with respect to control of the radiation detector 1.

The radiation detector 1 includes a main controller 21 for performing an overall control of each section. The main controller 21 has a CPU, and operates the above sections 11, 12, 13, 14, 15, 16 by executing various programs. The above sections may each be divided into a controller that performs their functions.

<Method of Detecting Gamma-Rays with Radiation Detector>

Next, description will be given of a method of detecting gamma-rays with the radiation detector 1 (see FIG. 3.) In order to detect gamma-rays with the radiation detector 1, a base line is determined (Base-Line Determining Step S1), and then detection of gamma-rays starts (Detection Starting Step S2.) Then the intensity-data acquiring section 11 starts acquiring the intensity data S (Intensity-Data Acquisition Starting Step S3), and detects an event that gamma-rays have entered into the scintillator 2 (Event Detecting Step S4.) Subsequently, a correction value A is acquired (Correction-Value Acquiring Step S5), and an intensity data S is corrected in accordance with the correction value A and the intensity data S is integrated with a time (Correcting/Integrating Step S6). Each of these steps will be described in order.

<Base-Line Determining Step S1>

Prior to detecting gamma-rays, the detection data D is acquired under a state where power supply from the bleeder unit 6 to the light detector 3 is intercepted. The detection data D is transmitted to the intensity-data acquiring section 11, where the intensity data S contained in the detection data D is acquired. Since the light detector 3 outputs the detection data Da every 10 ns, for example, the detection data D into which the detection data Da is digitized is outputted to from the A/D converter 10 to the intensity-data acquiring section 11 for every 10 ns. The intensity-data acquiring section 11 does not acquire the intensity data S for all the detection data D, but acquires the intensity data S at every sampling interval Sa (having an interval of 100 ms or more). Since output from the light detector 3 is 0 in theory, the intensity data S acquired in the state where no power is supplied from the bleeder unit 6 varies in accordance with noise factor from the circuit forming the A/D converter 10. The intensity-data acquiring section 11 repeatedly acquires the intensity data S for 40 times, for example, and averages the intensity data S to obtain a base level B. The base level B is stored in a set-value storing section 35. In this step, the sampling interval Sa of the intensity-data acquiring section 11 is longer than 10 ns which is a time interval when the light detector 3 detects fluorescence. The intensity-data acquiring section 11 acquires a set value of the sampling interval Sa by reading out the set value from the set-value storing section 35. The set-value storing section 35 corresponds to the storing device in this example.

<Detection Starting Step S2>

Subsequently, a subject with radiopharmaceutical administered thereto lies in front of the radiation detector 1 under the state where power is supplied from the bleeder unit 6 to the light detector 3, and detection of gamma-rays starts. The detection data Da of analog data is transmitted from the light detector 3 to the A/D converter 10 upon starting detection of gamma-rays. The A/D converter 10 digitizes the detection data Da, and transmits the digitized detection data to the intensity-data acquiring section 11.

The four pieces of detection data Da outputted from the light detector 3 are also outputted to the event detecting section 13. The event detecting section 13 reads a threshold value p1 for intensity-data comparison storing in the set-value storing section 35, and compares the threshold value p1 with a value of fluorescence intensity represented by the sum of the four channels of detection data Da. This comparison is performed for every output of the detection data Da from the light detector 3. Accordingly, assumed that the detection data Da is transmitted to the event detecting section 13 for every 10 ns, the event detecting section 13 performs comparison for every 10 ns. Here, the threshold value p1 is set higher than intensity represented by the intensity data S of the detection data Da outputted from the light detector 3 under a state where no gamma-ray enters into the scintillator 2 and thus the scintillator 2 emits no fluorescence. Consequently, the threshold value p1 is higher than the intensity data S under the state where no fluorescence is generated.

<Intensity-Data Acquiring Step S3>

Detection of gamma-rays starts, and at the same time, collection of intensity data S by the intensity data acquisition section 11 starts. That is, the intensity-data acquiring section 11 acquires the intensity data S contained in the digitized detection data D. The detection data D is outputted from the light detector 3 to the intensity-data acquiring section 11 for every 10 ns, for example. As is described in Base-Line Determining Step S1, the A/D converter 10 outputs the detection data D to the intensity-data acquiring section 11 for every 10 ns. The intensity-data acquiring section 11 acquires the intensity data S at every sampling interval Sa (for every 10 ns in this step). The acquired intensity data S is correlated with time data, and is transmitted to the intensity-data accumulating section 12, the time data representing a time when the light detector 3 detected the detection data D as a basis of the intensity data S.

<Event-Detecting Step S4>

It is supposed that the event detecting section 13 continuously comparing the intensity data S with the threshold value p1 confirms the intensity data S having a value over the threshold value p1. Here, it means that, as illustrated in FIG. 4(a), the intensity data S as the base level B increases due to generation of fluorescence. That is, a time T when the intensity data S exceeds the threshold value p1 represents a time when gamma-rays enter into the scintillator 2. Incidence of gamma-rays into the scintillator 2 is called an event, the time T when the event occurs is called an event-occurrence time.

The amount of energy of gamma-rays entered into the scintillator 2 can be obtained by determining intensity of fluorescence emitted due to the incident gamma-rays. Specifically, supposing that the intensity data S from a time T0 immediately prior to the event-occurrence time T until a time U after a given event-integration time Tn elapses is integrated with a time, the integral value represents intensity of fluorescence (i.e., an integrated value m of fluorescence).

Next, description will be given of the time T0. The time T0 is a time when the intensity data S in the base level B starts to be higher than the base level B. As noted above, the event detecting section 13 confirms event occurrence from the event-occurrence time T, and determines the integrated value m of fluorescence with the time T0 prior to the event-occurrence time T as a starting point.

In FIG. 4(a), the integrated value is a value when the intensity data S in a diagonal section denoted by the symbol M1 is integrated. It is more preferable to integrate the intensity data with a longer time for calculating the integrated value m of fluorescence accurately. This is because it takes much time to completely annihilate fluorescence once fluorescence is emitted as illustrated in FIG. 4(a). On the other hand, gamma-rays actually enter successively into the scintillator 2. As a result, the intensity data S is to be integrated before fluorescence has been annihilated completely.

It is to be considered when gamma-rays enter into the scintillator 2 twice. The intensity data S represents intensity in the base level B immediately prior to the first incidence of gamma-rays. When gamma-rays enter under this state, fluorescence is emitted from the scintillator 2. Consequently, the intensity represented by the intensity data S rapidly rises, and then gradually falls. Although almost all fluorescence is annihilated in the scintillator 2, very slight fluorescence remains in the scintillator 2 as afterglow for a long duration of around 1 s. It also takes much time for the intensity data S to fall into the base level B due to influences of the afterglow factor (see the symbol ag in FIG. 4).

It is supposed that gamma-rays enter into the scintillator 2 with the afterglow remaining in the scintillator 2. The scintillator 2 is to emit fluorescence upon radiation incidence before the afterglow has not been annihilated completely. Here, let an event-occurrence time representing the second radiation incidence be denoted by V (see FIG. 4). The event-occurrence time V is obtained by the event detecting section 13.

In order to determine an integrated value m of fluorescence derived from gamma-rays secondly entered, it is supposed that the intensity data S from a time V0 immediately prior to the event-occurrence time V until a time X after a given event-integration time Tn elapses is integrated with a time. The event integration time Tn is fixed that is used for calculating the integrated value m.

Next, description will be given of the time V0. The time V0 is further prior to a time when the falling intensity data S starts to rise. As noted above, the event detecting section 13 confirms event occurrence from the event-occurrence time V, and determines the integrated value m of fluorescence with the time V0 prior to the event-occurrence time V as a starting point.

In FIG. 4(a), the integrated value is a value when the intensity data S in a diagonal section denoted by the symbol M2 is integrated. Since the two integrated values m of fluorescence in gamma-rays are same in FIG. 4(a), the diagonal section denoted by the symbol M1 has the same integrated value as that of the diagonal section denoted by the symbol M2.

In actual, however, it is not always the case. FIG. 4(b) illustrates both the diagonal sections M1 and M2 picked out from FIG. 4(a). As is apparent from comparison between the diagonal sections M1 and M2, the diagonal section M2 is larger in area than the diagonal section M1 by the afterglow factor ag (see FIG. 4(a).) The afterglow component ag is derived from the first gamma-rays emitted prior to the second gamma-rays for acquiring the integrated value m of fluorescence, and is originally derived independently of the second gamma-rays. Thus, the integrated value m of fluorescence in the second gamma-rays cannot be accurately determined under the influences of the afterglow component ag. Then, in Example 1, the correction value A for correcting variations in intensity data S resulting from the afterglow component ag is acquired, achieving more accurate acquisition of the integrated value m of fluorescence.

<Correction-Value Acquisition Step S5>

The event-occurrence time T detected by the event detecting section 13 is transmitted to the correction-value acquiring section 14. The correction-value acquiring section 14 reads out successive 16 points of intensity data S1 to S16 detected immediately prior to the event-occurrence time T from the intensity-data accumulating section 12. Then the points of intensity data S1 to S16 are averaged to determine an average value Sv. Since the intensity data S1 to S16 each contains circuit noise in the A/D converter 10, the data contains a noise component independent of attenuation of the afterglow component ag. The noise component is removed by averaging the intensity data S1 to S16. The afterglow component ag should be gradually attenuated during determining the intensity data S1 to S16. However, since the attenuation is gradual, the afterglow component ag is almost fixed during determining the intensity data S1 to S16. Here, the intensity-data acquiring section 11 acquires the intensity data S1 to S16 by transmitting the detection data from the A/D converter 10 for 16 times at temporally-constant sampling intervals Sa (10 ns.)

The intensity data S16 among the intensity data S1 to S16 is based on the detection data Da obtained at a time nearest to the event-occurrence time T. Here, a time interval between the intensity data S16 and the event-occurrence time can be set freely. It is preferable that a time interval between the event-occurrence time T and the time when the detection data Da is determined is the sampling interval Sa or less.

The correction-value acquiring section 14 reads out the base level B from the set-value storing section 35, and subtracts the base level B the average value Sv to obtain the correction value A (see FIG. 4(c).) Consequently, the correction value A represents intensity of the afterglow component ag immediately prior to the second incidence of gamma-rays.

<Correcting/Integrating Step S6>

The correction value A is transmitted to the integrating section 15. Beside the correction value A, the digitized detection data D from the A/D converter 10 and the obtained event-occurrence time from the event detecting section 13 have been transmitted to the integrating section 15. The integrating section 15 integrates the intensity data S with a time, thereby calculating the integrated value m of fluorescence, the intensity data S being from the time T0 immediately prior to the event-occurrence time T or the time V0 immediately prior to the event-occurrence time V until the time U or X after the given event-integration time Tn elapses (correctly, a value obtained by subtracting the base level B from the intensity data S.) As is described with use of the symbol M2 in FIG. 4(b), the integrated value m contains unnecessary afterglow component ag added thereto. Then the integrating section 15 multiplies the correction value A by the event integration time Tn between the time T0 immediately prior to the T and the time U (or between the time V and the time X) to obtain a multiplication value, and then subtracts the multiplication value from the integrated value m. As a result, the integrated value m is corrected for the afterglow component.

The corrected integrated value m is used for identifying a position of the scintillator 2 where fluorescence is emitted. In this case, since the integrated value m from which the influences of the afterglow component have already been removed is used, the integrated value m represents the intensity of fluorescence more accurately. Consequently, the generating position of fluorescence can be determined more accurately.

As noted above, Example 1 includes the integrating section 15 for integrating the intensity data S representing the intensity of fluorescence outputted from the light detector 3 for every temporally-constant sampling interval Sa, and calculates the integrated value m representing the intensity of fluorescence generated by incident gamma-rays into the scintillator 2. Output of the integrating section 15 is used for identifying the generation positions of fluorescence within the scintillator 2. Since complete annihilation of the fluorescence generated in the scintillator 2 requires a longer time, the intensity data S outputted from the light detector 3 contains the afterglow component of the fluorescence. Consequently, the integrating section 15 calculates the integrated value m including the afterglow factor unnecessarily and additionally, resulting in some affect in identifying the position of fluorescence.

Accordingly, Example 1 includes the intensity-data acquiring section 11 for acquiring intensity data S representing the intensity of fluorescence outputted from the light detector 3 for every temporally-constant sampling interval Sa, and the correction-value acquiring section 14 for acquiring the correction value A used for correcting variations in intensity data S resulting from the afterglow of fluorescence. In addition, Example 1 includes the integrating section 15 for correcting the intensity data S using the correction value A. This allows correct calculation of the integrated value m with no influence of the afterglow of fluorescence. Consequently, Example 1 enables to provide the radiation detector 1 that allows correct identification of the generation positions of fluorescence.

The intensity data S as a basis of the correction value A contains, besides the factor with respect to fluorescence, various factors from each device for performing information processing to provide the construction of Example 1. Here, the correction value A is calculated by subtracting the basal value as the intensity data S acquired with no power being applied to the light detector 3 from the intensity data S, resulting in provision of the radiation detector 1 that allows accurate determination of the integrated value m.

As in Example 1, the correction value A is acquired by averaging two or more pieces of intensity data S, resulting in provision of the radiation detector 1 that allows more accurate correction of the integrated value m with no influence of the noise component in the intensity data S.

Example 2

Next, description will be given to a radiation detector according to Example 2. The configuration of the radiation detector in Example 2 is similar to that in Example 1 illustrated in FIG. 1.

The radiation detector 1 according to Example 2 includes an intensity-data acquiring section 11; an intensity-data accumulating section 12; an event detecting section 13; a correction-value acquiring section 14; and an integrating section 15. The intensity-data acquiring section 11 acquires intensity data S contained in detection data (correctly, detection data D obtained by digitizing the detection data) outputted from a light detector 3 for every sampling interval Sa. The intensity-data accumulating section 12 accumulates the intensity data S acquired by the intensity-data acquiring section 11. The event detecting section 13 compares the intensity data S successively acquired and an event threshold value p1 for intensity-data comparison and recognizes that, when the intensity data S exceeds the event threshold value p1, an event has occurred that gamma-rays enter into a scintillator 2, thereby obtaining an event-occurrence time T as a time when the event has occurred. The correction-value acquiring section 14 compares the intensity data S obtained by the intensity-data acquiring section 11 with a fluorescence threshold value p2 for identification, and recognizes that the intensity data S of the fluorescence threshold value p2 or more is obtained during the event occurs, and that the intensity data S less than the fluorescence threshold value p2 is obtained during no event occurs, and acquires a correction value A used for correcting variations in intensity data S resulting from afterglow of fluorescence in accordance with the intensity data S acquired during no event occurs. The integrating section 15 integrates the intensity data S detected immediately prior and subsequent to the event-occurrence time T and performs correction with the correction value A.

Example 2 differs from Example 1 in construction of the intensity-data acquiring section 11 and the correction-value acquiring section 14. Thus, description will be given of each construction of the sections.

Firstly, description will be given of the intensity-data acquiring section 11 according to Example 2. The intensity-data acquiring section 11 does not acquire the intensity data S for all the detection data D, but acquires the intensity data S at every sampling interval Sa. The sampling interval Sa in Example 2 is longer than that of 10 ns in Example 1, i.e., around 100 ms. See FIG. 5. The sampling interval Sa is longer than a time interval when the integrating section 15 integrates the intensity data S for one-time dose of gamma-ray with a time. Thus, the sampling interval Sa of the intensity-data acquiring section 11 is longer than 10 ns which is the time interval when the light detector 3 detects fluorescence. The intensity-data acquiring section 11 acquires a set value of the sampling interval Sa by reading out the set value from the set-value storing section 35. The intensity-data acquiring section 11 transmits the acquired intensity data S to the intensity-data accumulating section 12.

Next, description will be given of operations of the correction-value acquiring section 14. The correction-value acquiring section 14 is in a standby state until the intensity-data accumulating section 12 accumulates 40 points of intensity data S. Upon completing accumulation, 40 points of intensity data S are determined to calculate an average value Sv. The correction-value acquiring section 14 reads out the base level B from the set-value storing section 35, and subtracts the base level B from the average value Sv to obtain the correction value A. In Example 1, the average value Sv is determined in accordance with 16 points of intensity data obtained for 150 ns. On the other hand, in Example 2, the average value Sv is determined in accordance with 40 pieces of intensity data S acquired for 3.9 seconds. Accordingly, the average value Sv in Example 2 differs from that in Example 1 in characteristic.

As noted above, it is not always necessary to transmit the event-occurrence time T from the event detecting section 13 to the correction-value acquiring section 14.

Figure 5:
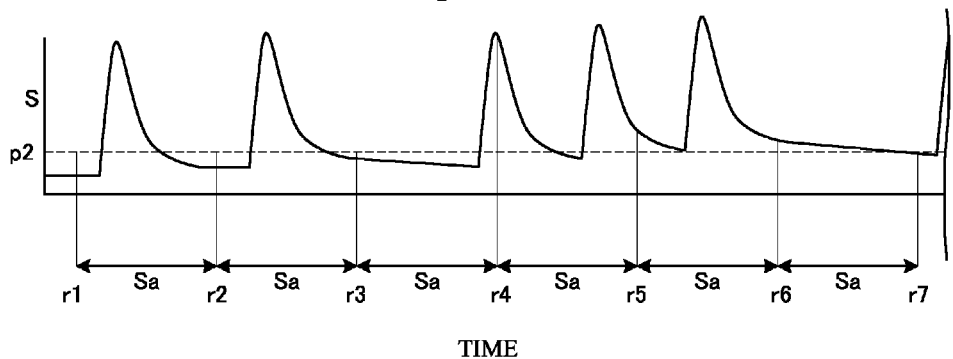
FIG. 5 is a schematic view illustrating operations of a radiation detector according to another example of the invention.

Acquisition of the actual average value Sv requires a time over 3.9 seconds. Next, description will be given of this. FIG. 5 illustrates operations of the intensity-data acquiring section according to Example 2. As illustrated in FIG. 5, the intensity-data acquiring section 11 acquires the intensity data S at every sampling interval Sa. Here, let a time when the intensity data S is acquired be denoted by r1 to r7 in order of elapsed time.

The intensity-data acquiring section 11 acquires the intensity data S at given time intervals, whereas the timing when gamma-rays enter into the scintillator 2 is random. Consequently, the intensity data S acquired by the intensity-data acquiring section 11 includes the intensity data S where the scintillator 2 exhibits strong fluorescence. The intensity data S acquired in this state is obstructive for acquiring the correction value A with the correction-value acquiring section 14. The correction value A represents a degree of increasing the intensity of the intensity data due to the afterglow component ag that is hard to attenuate. Thus, if the intensity data S containing fluorescence that is not the afterglow component is also used for calculating the average value Sv, it becomes impossible to determine the afterglow factor ag overlapped in the intensity data S accurately.

Accordingly, the correction-value acquiring section 14 reads out the fluorescence threshold value p2 for identification stored in the se-value storing section 35, compares the intensity data S with the fluorescence threshold value p2 for every transmittance of the intensity data S, and uses only the intensity data S less than the fluorescence threshold value p2 for calculating the average value Sv. Specifically, as illustrated in FIG. 5, since the intensity data S at the times r1, r2, r3, r7 is each obtained when no event above occurs, the intensity data S can be used for calculating the average value Sv. On the other hand, since the intensity data S at the other times r4, r5, r6 is each acquired during the event above occurs, the intensity data S cannot be used for calculating the average value Sv.

As noted above, the correction-value acquiring section 14 does not use all the transmitted intensity data S. Moreover, the correction-value acquiring section 14 continuously compares the intensity data S with the fluorescence threshold value p2 for identification until 40 points of intensity data S are acquired. Consequently, it takes 3.9 seconds or more from starting acquisition of the intensity data S to acquire the correction value A with the correction-value acquiring section 14. The correction-value acquiring section 14 transmits the acquired correction value A to the integrating section 15. The integrating section 15 removes the influence of the afterglow factor ag contained in the detection data D in accordance with the correction value A.

Description will be given of operations of the correction-value acquiring section 14 after acquiring the correction value A. Immediately subsequent to calculating the correction value A, the correction-value acquisition section 14 is in a standby state until 40 points of intensity data S are again accumulated. Thereafter the correction-value acquisition section 14 calculates a new correction value A. As noted above, the correction-value acquiring section 14 successively acquires the correction value A by continuously comparing the intensity data S with the threshold value p2 for identification also after completion of acquiring the correction data A, and updates the correction value A for every correction-data acquisition. The integrating section 15 uses a new correction value A for every update of the correction value A. Consequently, supposing that the correction-value acquiring section 14 performs no comparison relating the threshold value p2, the correction value A is to be updated for every 3.9 seconds.

<Operation of Radiation Detector>

Figure 6:
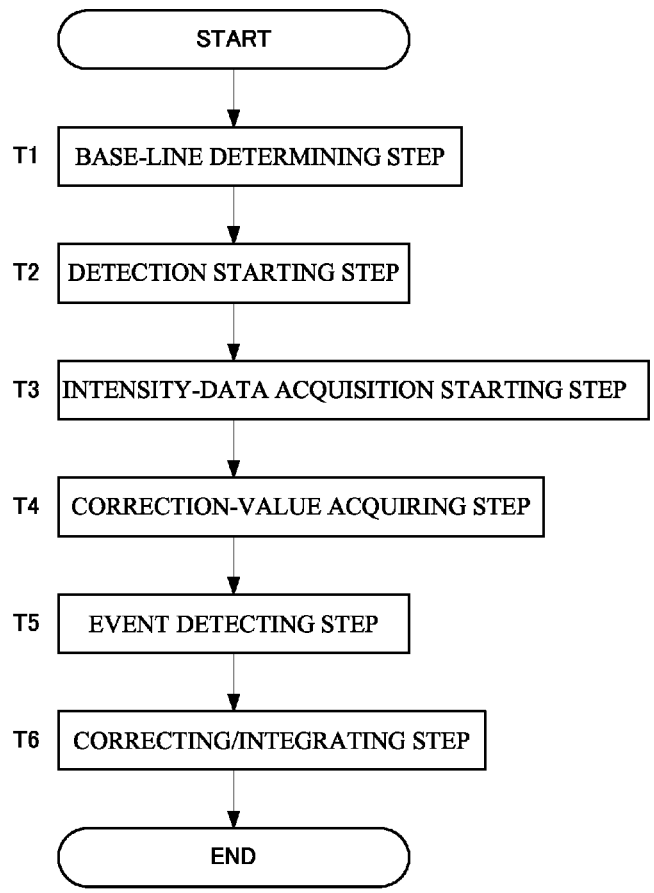
FIG. 6 is a flow chart illustrating operations of the radiation detector according to the other example of the invention.

Firstly, description will be given to operations of the radiation detector 1 according to Example 2. See FIG. 6. In order to detect gamma-rays with the radiation detector 1, a base line is determined (Base-Line Determining Step T1), and then detection of gamma-rays starts (Detection Starting Step T2.) Then the intensity-data acquiring section 11 starts acquiring the intensity data S (Intensity-Data Acquisition Starting Step T3.) Subsequently, the correction value A is acquired (Correction-Value Acquiring Step T4.) Then an event that gamma-rays have entered into the scintillator 2 is detected (Event Detecting Step T5), and the intensity data S is corrected in accordance with the correction value A and the intensity data S is integrated with a time (Correcting/Integrating Step T6). The operations of the radiation detector in Example 2 is almost similar to those in Example 1, but differ in that the correction value A is acquired independently of detection of the event. The operation of the radiation detector in the correction-value acquiring step T4 corresponds to the operation of the correction-value acquiring section 14 above. The steps T1 to T3, and T6 correspond to the steps S1 to S3, and S6, in Example 1, respectively. The event detecting step T5 corresponds to the event detecting step S4 in Example 1.

As noted above in Example 2, the correction-value acquiring section 14 continuously compares the intensity data S with the fluorescence threshold value p2 for identification until the given points of intensity data S are acquired, resulting in acquisition of the average value of the intensity data S with high-reliability. Such a configuration is advantageous where all of the intensity data S cannot be used for calculation of the average. As a result, similar to Example 1, Example 2 having such construction as above enables to provide the radiation detector 1 that allows identification of accurate incident positions of gamma-rays.

The above describes in detail the second construction in Example 2. The correction-value acquiring section 14 successively acquires the correction value A by continuously comparing the intensity data S with the threshold value p2 for identification also after completion acquiring the correction-data A, and updates the correction value A. This allows provision of the radiation detector 1 that enables to correct the integrated value m accurately following temporal variations in characteristic of the radiation detector 1 for detecting gamma-rays.

This invention is not limited to the foregoing constructions, but may be modified as follows:

(1) In Example 1, the correction-value acquiring section 14 subtracts the base level B from the average value Sv to determine the correction value A. This invention is not limited to such construction. Specifically, the intensity data S may be corrected without using the correction value A directly depending on the value of the correction value A. That is, the correction-value acquiring section 14 may acquire the correspondence value R, corresponding to the correction value A, in accordance with a table relating to the correction value A stored in the set-value storing section 35 and the correspondence value R when the correction value A determined by subtracting the base level B from the average value Sv is double-event threshold value q1 or more that is stored in the set-value storing section 35. The integrating section 15 may correct the intensity data S in accordance with the correspondence value R.

Figure 7:
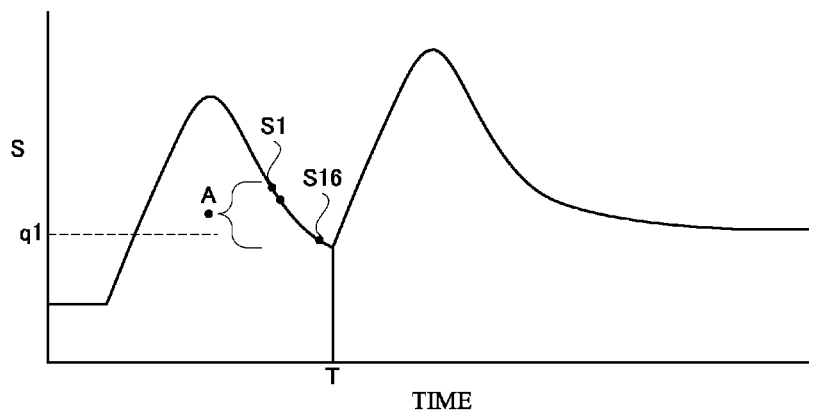
FIGS. 7 and 8 are schematic views each illustrating operations of a radiation detector according to one modification of the invention.

Concrete description will be given of this modification. FIG. 7 illustrates a relationship between the intensity data S and a time when two gamma-rays enter into the scintillator 2. In FIG. 7, the second gamma-rays enter into the scintillator under a state where strong afterglow remains in the scintillator 2. Since the average value Sv is calculated based on the intensity data S having the strong afterglow, the correction value A is high accordingly. Upon acquiring the correction value A, the correction-value acquiring section 14 compares the correction value A with the double-event threshold value q1. Where the correction value A is less than the double-event threshold value q1, the correction-value acquiring section 14 transmits the correction value A to the integrating section 15. Here, the operation of the integrating section is similar to that described in Example 1.

Where the correction value A is the double-event threshold value q1 or more (see FIG. 7), the correction-value acquiring section 14 transmits no correction value A to the integrating section 15. On the other hand, the correction-value acquiring section 14 reads out a correlated table having a relationship between the correction value A from the set-value storing section 35 and the correspondence value R, thereby acquiring the correspondence value R corresponding to the correction value A. Thereafter, the correction-value acquiring section 14 transmits the correspondence value R to the integrating section 15. The integrating section 15 operates with the correspondence value R instead of the correction value.

Where the times when two gamma-rays enter into the scintillator 2 are close to each other, gamma-rays enter into the scintillator 2 in which afterglow gradually decreases. As a result, the intensity data S cannot be corrected taking the correction value A calculated from the intensity data S prior to the event-occurrence time as the afterglow factor ag subsequent to the event-occurrence time. This is because the intensity of the afterglow factor ag greatly differ s prior and subsequent to the event-occurrence time T.

Thus, when the correction value A is the double-event threshold value $q1$ or more, the correction-value acquiring section 14 confirms that too many afterglow factor ag remain and the calculated correction value A cannot be used for correcting the intensity data S subsequent to the event-occurrence time T. Instead of the correction value A, the correspondence value R is used for correction with the integrating section 15. The correspondence value R corresponding to the correction value A represents a degree of afterglow factor ag contained in the integrated value m calculated through integration by the integrating section 15. The correspondence value R is acquired by determining attenuation of the afterglow factor ag after gamma-rays enter into the scintillator 2. Then where next gamma-rays enter into the scintillator immediately subsequent to incidence of gamma-rays, a value of afterglow factor ag added and overlapped from the event-occurrence time T to the time U is determined by simulations in accordance with the measurement data. The determined value is divided by an event-integration time Tn from the time T0 immediately prior to the event-occurrence time T to the time U to obtain the correspondence value R. Since the correspondence value R determined through the simulation varies in accordance with the interval between the times when two gamma-rays enter, two or more correspondence values R are to be determined.

The intensity data S (or the correction value A determined based on this data) immediately prior to incidence of the second gamma-rays varies in accordance with the interval between the times when two gamma-rays enter. Consequently, the correction data A can be used as an index indicating the interval between the times when two gamma-rays enter. Specifically, it can be determined in advance which correspondence value R is used with the correlated table in accordance with the correction value A acquired while the radiation detector 1 operates examinations.

Figure 12:
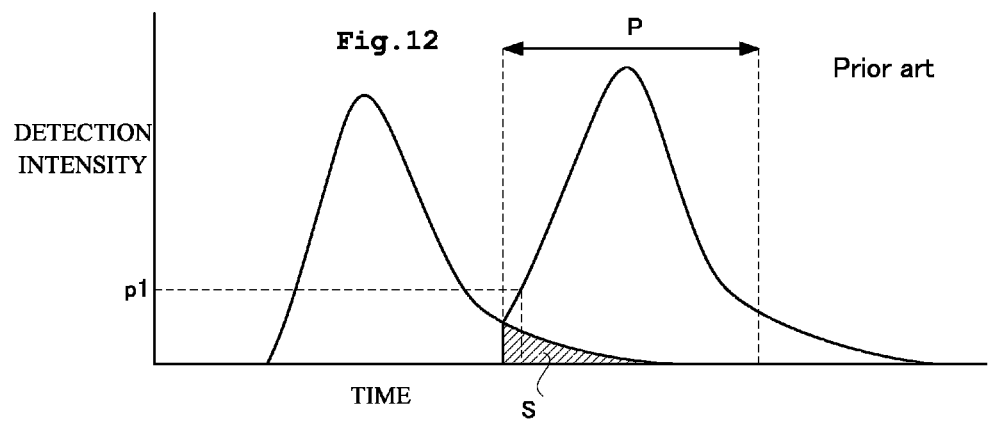
Figure 13:
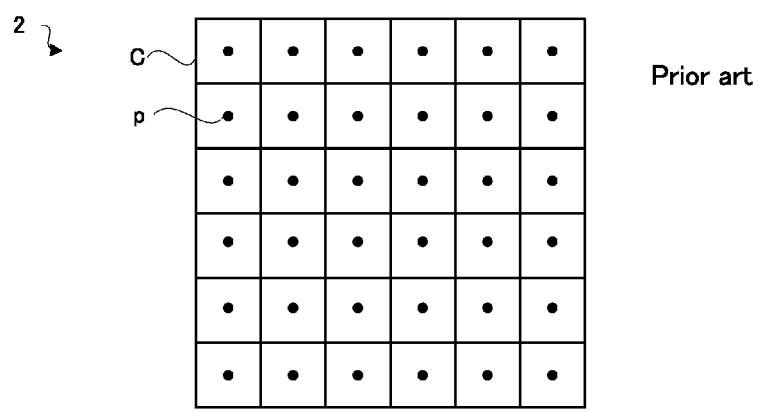
Figure 14:
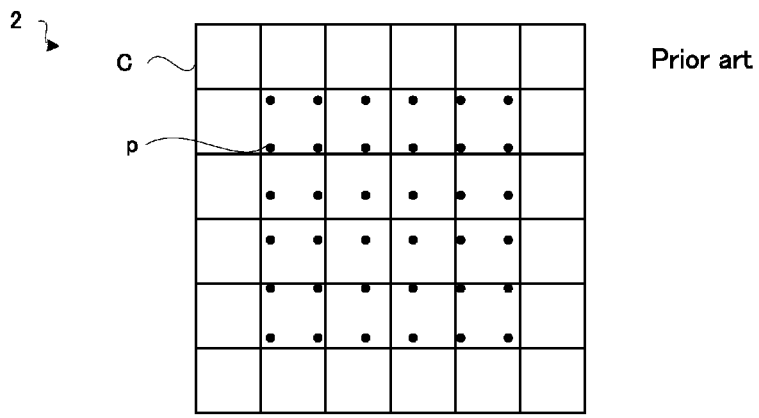

In this modification as above, the integrating section 15 corrects the intensity data S in accordance with the correspondence value R other than the correction value A when the correction value A is the double-event threshold value $q1$ or more. Where the acquired correction value A is high, it is recognized that current gamma-rays enter into the scintillator 2 immediately subsequent to previous gamma-rays enter into the scintillator 2. Accordingly, the integrated value m also containing the afterglow factor of the previous gamma-rays is to be calculated upon determining the integrated value m concerning current gamma-rays. Thus it is difficult to obtain the correction value A simply from the intensity data S acquired prior to the event-occurrence time T when fluorescence concerting current gamma-rays starts emitting. That is, as illustrated in FIG. 12, two of fluorescence overlaps each other and the previous fluorescence attenuates during determining the current fluorescence. Consequently, the afterglow factor ag is not fixed during determining the current fluorescence. As a result, the foregoing construction adopts the correspondence value R that corresponds to the correction value A for correcting the integrated value m. The correspondence value R is variable so as to perform suitable correction in accordance with the correction value A. Consequently, the foregoing construction of this invention enables to provide the radiation detector 1 that allows accurate calculation of the integrated value m with no influence of the afterglow factor of fluorescence.

(2) In Example 1, the correction-value acquiring section 14 acquires the correction value A by subtracting the base level B from the average value Sv. This invention, however, is not limited to this. Specifically, the intensity data S does not need to be corrected depending on the correction value A. In this modification, where the acquired correction value A is the multiple-event threshold value $q2$ or more, representing higher intensity than a first threshold value $q1$, the correction-value acquiring section 14 does not operate and the integrating section 15 performs no correction for calculating the integrated value m. The correction value acquisition section 14 uses the multiple-event threshold value $q2$ stored in the set-value storing section 35.

Figure 8:
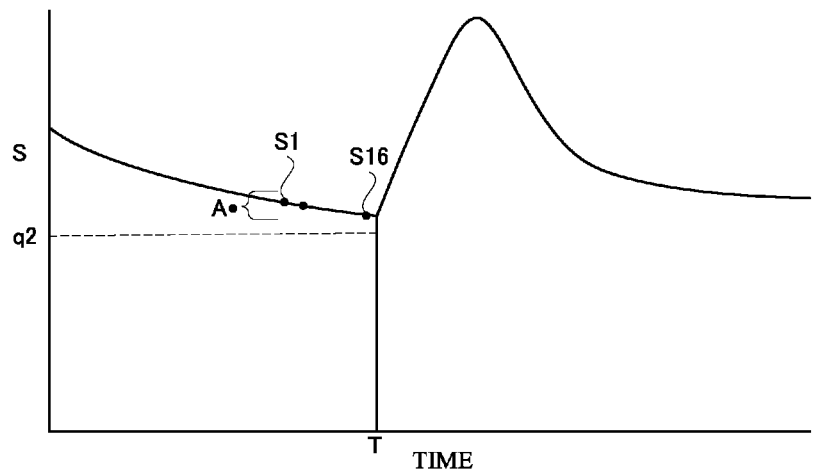

Concrete description will be given of this modification. FIG. 8 illustrates a relationship between the intensity data S and a time when gamma-rays enter into the scintillator 2. In FIG. 8, the intensity data S indicates higher intensity prior to incidence of gamma-rays. Every time gamma-rays enter into the scintillator 2, the afterglow factor ag is generated. Then, the afterglow factor ag is overlapped one after another, resulting in the higher value of the intensity data S with no incident gamma-rays into the scintillator 2. Such a phenomenon is called pileup.

It is difficult to estimate the afterglow factor ag subsequent to the event-occurrence time T while the pileup has occurred. This is because the pileup causes overlap of the afterglow factor ag having various degrees of attenuation. The correction-value acquiring section 14 acquires the correction value A and then compares the correction value A with the multiple-event threshold value $q2$. Where the correction value A is less than the multiple-event threshold value $q2$, the correction-value acquiring section 14 confirms that no pileup has occurred, and transmits the correction value A to the integrating section 15. Here, the integrating section 15 operates in a similar manner to that described in Example 1.

Where the correction value A is the multiple-event threshold value $q2$ or more (see FIG. 8), the correction-value acquiring section 14 confirms that no correction value used by the integrating section 15 can be calculated, and transmits no correction value A to the integrating section 15. The integrating section 15 acquires the integrated value m with no correction.

In this modification, where the acquired correction value A is the multiple-event threshold value $q2$ or more, representing higher intensity than the double-event threshold value $q1$, the correction-value acquiring section 14 does not operate. Where the intensity data S prior to the event-occurrence time T is the multiple-event threshold value $q2$ or more, the intensity data S contains the afterglow factor overlapped one after another. In this case, it is difficult to calculate the correction value A. With the above-mentioned construction, where the intensity data S prior to the event-occurrence time T indicates a higher value and thus the correction value A of high reliability cannot be acquired, the integrating section 15 acquires the integrated value m with no correction. This needs no correction, resulting in the radiation detector 1 that allows accurate determination of the integrated value m with no influence of the afterglow factor of fluorescence.

(3) This invention may perform two modifications mentioned above simultaneously. Specifically, where the correction value A is less than the double-event threshold value q1, the correction-value acquiring section 14 transmits the value to the integrating section 15. Where the correction value A is the double-event threshold value q1 or more and less than the multiple-event threshold value q2, the correspondence value R is transmitted to the integrating section 15, Where the correction value is the multiple-event threshold value q2 or more, no value is transmitted to the integrating section 15. Such may be adopted.

(4) The two examples of this invention may be switched automatically depending on a rate of event occurrence, i.e., a counting rate. That is, where the double or multiple events readily occur and the counting rate is high, the operations in Example 1 are performed, whereas the counting rate is low, the operations in Example 2 are performed. In both examples, as many correction values as possible have to be acquired as immediately prior to occurrence of the event as possible for securing accuracy of the correction value A. In Example 1, the afterglow factor immediately prior to the event and prior to the target event may be detected. Moreover, since data processing becomes complicated, frequency of acquiring the intensity data is restricted, resulting in decreased statistics accuracy of the correction value A. On the other hand, in Example 2, the frequency of acquiring the intensity data is not restricted, resulting in enhanced statistics accuracy of the correction value A. However, time lag may occur from the actual afterglow characteristic. Then the counting rate is monitored. Where the double or multiple events readily occur and the counting rate is high, the operations in Example 1 are performed, whereas the counting rate is low, the operations in Example 2 are performed. Consequently, advantages of both examples can be used efficiently.

(5) The set value has been disclosed exemplary in each example. Consequently, each set value may be freely modified.

(6) In each of the foregoing examples, the scintillation crystal is composed of LYSO. Alternatively, the scintillation crystal may be composed of other materials, such as LGSO ($Lu_{2(1-x)}G_{2x}SiO_5$) and GSO ($Gd_2SiO_5$), may be used in this invention. According to this modification, a method of manufacturing a radiation detector may be provided that allows provision of a radiation detector of low price.

(7) The light detector in each of the foregoing embodiments is formed of the photomultiplier tube. This invention is not limited to this embodiment. A semiconductor detector such as a photodiode, an avalanche photodiode, and a silicon photomultiplier may be used instead of the photomultiplier tube.

INDUSTRIAL UTILITY

As described above, this invention is suitable for a radiation detector for medical uses.

DESCRIPTION OF REFERENCES m integrated value
q1 double-event threshold value
q2 multiple-event threshold value
A correction value
R correspondence value
S intensity data
Sa sampling interval
T, V event-occurrence time
Tn event-integration time
2 scintillator
3 light detector
5 bleeder unit
11 intensity-data acquiring section (intensity-data acquiring device)
12 intensity-data accumulating section (intensity-data accumulating device)
13 event detecting section (event detecting device)
14 correction-value acquiring section (correction-value acquiring device)
15 integrating section (integrating device)
16 fluorescence generating-position identifying section (fluorescence generating-position identifying device)
35 set-value storing section (set-value storing device)

The invention claimed is:

1. A radiation detector comprising:
(A) a scintillator having scintillation crystals for converting radiation into fluorescence being arranged;
(B) a light detector for detecting fluorescence;
(C) an intensity-data acquiring device for acquiring intensity data representing intensity of the fluorescence outputted from the light detector for every temporally-constant sampling interval;
(D) an intensity-data accumulating device for accumulating the intensity data acquired by the intensity-data acquiring device;
(E1) a storing device for storing a plurality of event threshold values;
(F) an event detecting device for comparing the intensity data to be acquired successively and an event threshold value for intensity data comparison and recognizing that, when the intensity data exceeds the event threshold value, the event that radiation enters into the scintillator occurs, thereby obtaining an event-occurrence time when the event occurs;
(G1) a correction-value acquiring device for acquiring a correction value in accordance with intensity-data and double-event threshold value and multiple-event threshold value, the intensity data being detected prior to the event-occurrence time and the correction value being used for correcting variations in intensity data resulting from afterglow of the fluorescence; and
(H) an integration device for calculating an integrated value by integrating the intensity data detected prior and subsequent to the event-occurrence time and performing correction using the correction value.

2. The radiation detector according to claim 1, wherein the correction-value acquiring device acquires a correspondence value, corresponding to the correction value, in accordance with a table having a relationship between the correction value stored in the storing device and the correspondence value when the acquired correction value is the double-event threshold value or more, and the integrating device corrects the intensity data in accordance with the correspondence value.

3. The radiation detector according to claim 2, wherein the correction-value acquiring device performs no operation when the acquired correction value is the multiple-event threshold value or more, the multiple-event threshold value representing a higher value than the double-event threshold value, and the integrating device calculates the integrated value with no correction.

4. The radiation detector according to claim 1, further comprising:

a fluorescence generating-position identifying device for identifying generating positions of fluorescence in the scintillator with use of the integrated value generated by the integrating device.

5. The radiation detector according to claim 2, further comprising:
a bleeder unit for supplying power to the light detector, wherein
the correction value to be acquired by the correction-value acquiring device is calculated by subtracting a base value as the intensity data from the intensity data, the intensity data being acquired with no power being applied to the light detector.

6. The radiation detector according to claim 2, wherein
(I) the correction-value acquiring device acquires the correction value by averaging two or more pieces of intensity data.

7. The radiation detector according to claim 2, further comprising:
a fluorescence generating-position identifying device for identifying generating positions of fluorescence in the scintillator with use of the integrated value generated by the integrating device.

8. A radiation detector comprising:
(A) a scintillator having scintillation crystals for converting radiation into fluorescence being arranged;
(B) a light detector for detecting fluorescence;
(C) an intensity-data acquiring device for acquiring intensity data representing intensity of the fluorescence outputted from the light detector for every temporally-constant sampling interval;
(D) an intensity-data accumulating device for accumulating the intensity data acquired by the intensity-data acquiring device;
(E2) a storing device for storing a fluorescence threshold value;
(F) an event detecting device for comparing the intensity data to be acquired successively and an event threshold value for intensity data comparison and recognizing that, when the intensity data exceeds the event threshold value, the event that radiation enters into the scintillator occurs, thereby obtaining an event-occurrence time when the event occurs;
(G2) a correction-value acquiring device for comparing the intensity data acquired by the intensity-data acquiring device with a fluorescence threshold value for fluorescence identification, and recognizing that the intensity data less than the fluorescence threshold value is acquired when no event occurs, thereby acquiring a correction value for correcting variations in intensity data in accordance with the intensity-data acquired in this state, the variations in intensity data resulting from afterglow of the fluorescence; and
(H) an integration device for calculating an integrated value by integrating the intensity data detected prior and subsequent to the event-occurrence time and performing correction using the correction value.

9. The radiation detector according to claim 8, wherein
the light detector detects fluorescence for a time interval, and
the intensity-data acquiring device has the sampling interval longer than the time interval of the light detector for detecting fluorescence.

10. The radiation detector according to claim 8, wherein
the intensity-data acquiring device has the sampling interval of 10 microseconds or more for acquiring the intensity data.

11. The radiation detector according to claim 1, further comprising:
a bleeder unit for supplying power to the light detector, wherein
the correction value to be acquired by the correction-value acquiring device is calculated by subtracting a base value as the intensity data from the intensity data, the intensity data being acquired with no power being applied to the light detector.

12. The radiation detector according to claim 1, wherein
(I) the correction-value acquiring device acquires the correction value by averaging two or more pieces of intensity data read out from the intensity-data accumulating device.

13. The radiation detector according to claim 8, wherein
(I) the correction-value acquiring device acquires the correction value by averaging two or more pieces of intensity data read out from the intensity-data accumulating device, and
(J) the correction-value acquiring device continuously compares the intensity data with the fluorescence threshold value until a given number of points of the intensity data are acquired.

14. The radiation detector according to claim 13, wherein
(K) the correction-value acquiring device successively acquires the correction value by continuously comparing the intensity data with the threshold value for identification also after completion of acquiring the correction data, and updates the correction value for every correction-data acquisition.

* * * * *